(12) United States Patent
Havens et al.

(10) Patent No.: US 7,606,776 B1
(45) Date of Patent: Oct. 20, 2009

(54) FLEXIBLE CONSTRAINT PROPAGATION ENGINE FOR COMBINATORIAL OPTIMIZATION APPLICATIONS

(75) Inventors: William S. Havens, Vancouver (CA); Bistra N. Dilkina, Burnaby (CA)

(73) Assignee: Actenum Corporation, Vancouver, BC (CA)

( * ) Notice: Subject to any disclaimer, the term of this patent is extended or adjusted under 35 U.S.C. 154(b) by 492 days.

(21) Appl. No.: 11/529,764

(22) Filed: Sep. 28, 2006

Related U.S. Application Data

(60) Provisional application No. 60/721,201, filed on Sep. 28, 2005.

(51) Int. Cl.
G06E 1/00 (2006.01)
G06E 3/00 (2006.01)
G06F 15/18 (2006.01)
G06G 7/00 (2006.01)

(52) U.S. Cl. ...................................................... 706/19
(58) Field of Classification Search .................... 706/19
See application file for complete search history.

(56) References Cited

U.S. PATENT DOCUMENTS

| | | | | |
|---|---|---|---|---|
| 5,148,045 A * | 9/1992 | Oyanagi | ...................... | 706/19 |
| 5,267,346 A | 11/1993 | Maruyama et al. | | |
| 5,745,735 A * | 4/1998 | Cohn et al. | ...................... | 703/6 |
| 5,764,858 A * | 6/1998 | Sheu et al. | ...................... | 706/26 |
| 5,819,210 A | 10/1998 | Maxwell et al. | | |
| 5,848,402 A * | 12/1998 | Pao et al. | ...................... | 706/13 |
| 6,004,015 A * | 12/1999 | Watanabe et al. | .............. | 700/28 |
| 6,047,288 A | 4/2000 | Kurosawa et al. | | |
| 6,148,274 A * | 11/2000 | Watanabe et al. | .............. | 703/6 |
| 6,272,483 B1 | 8/2001 | Joslin et al. | | |
| 6,769,112 B1 | 7/2004 | Montana et al. | | |
| 6,826,549 B1 * | 11/2004 | Marks et al. | ................... | 706/11 |
| 7,089,221 B2 * | 8/2006 | Fromherz et al. | .............. | 706/46 |
| 7,444,309 B2 * | 10/2008 | Branke et al. | .................. | 706/13 |
| 7,447,669 B2 * | 11/2008 | Zhu | ............................. | 706/52 |
| 7,448,022 B1 * | 11/2008 | Ram et al. | ................... | 717/120 |
| 7,499,764 B2 * | 3/2009 | Fukui | ........................... | 700/33 |
| 7,523,445 B1 * | 4/2009 | Geller et al. | ................. | 717/126 |

(Continued)

OTHER PUBLICATIONS

Optimization of reliability allocation and testing schedule for software systems Lyu, M.R.; Rangarajan, S.; van Moorsel, A.P.A.; Proceedings The Eighth International Symposium on Software Reliability Engineering Nov. 2-5, 1997 pp. 336-347 Digital Object Identifier 10.1109/ISSRE.1997.630881.*

(Continued)

*Primary Examiner*—Michael B Holmes
(74) *Attorney, Agent, or Firm*—Knobbe Martens Olson & Bear, LLP

(57) ABSTRACT

The present disclosure describes a computer-implemented constraint propagation system that supports a variety of different constraint propagation and/or constraint retraction algorithms, including monotonic and/or non-monotonic algorithms. In one embodiment, the system selects particular constraint propagation and/or retraction methods based on the nature of the combinatorial optimization problem (COP) being solved and the attributes of the particular COP application involved. The system may also enable new methods for constraint propagation and/or retraction to be added with relatively little disruptive effect on other components of the system. Embodiments of the system allow the propagation of constraints to be tuned to the semantics of each constraint, the likelihood of significant variable domain reduction, and other problem specific properties. The constraint propagation system is capable of being used as part of a reconfigurable search engine.

41 Claims, 4 Drawing Sheets

U.S. PATENT DOCUMENTS

| | | | |
|---|---|---|---|
| 2003/0154209 | A1 | 8/2003 | Maxwell et al. |
| 2005/0065902 | A1 | 3/2005 | De Givry et al. |
| 2005/0177558 | A1 | 8/2005 | Dixon et al. |
| 2005/0187905 | A1 | 8/2005 | Dixon et al. |
| 2008/0140475 | A1 | 6/2008 | Li et al. |

OTHER PUBLICATIONS

A Varietal Genetic Algorithm by External Self-Evolving Multiple-Archives for Combinatorial Optimization Problems Chang, Pei-Chann; Huang, Wei-Hsiu; Ting, Ching-Jung; Chang, Wei-Je; High Performance Computing and Communications, 2009. HPCC '09. 11th IEEE International Conference on Jun. 25-27, 2009 pp. 609-614.*

A New Approach using Machine Learning and Data Fusion Techniques for Solving Hard Combinatorial Optimization Problems Zennaki, M.; Ech-cherif, A.; Information and Communication Technologies: From Theory to Applications, 2008. ICTTA 2008. 3rd International Conference on Apr. 7-11, 2008 pp. 1-5 Digital Object Identifier 10.1109/ICTTA.2008.453.*

A pattern-based evolving mechanism for genetic algorithm to solve combinatorial optimization problems Qing Wang; Kai Leung Yung; Wai Hung Ip; Soft Computing in Industrial Applications, 2003. SMCia/03. Proceedings of the 2003 IEEE International Workshop on Jun. 23-25, 2003 pp. 97-101 Digital Object Identifier 10.1109/SMCIA.2003.1231351.*

Schimkat et al., "Deploying Distributed State Information in Mobile Agent Systems", CoopIS 2001, LNCS 2172, Springer Berlin/Heidelberg, pp. 80-94, 2001.

Ginsberg et al., "GSAT and Dynamic Backtracking," 1994.

Wallace M. et al., "Finding the right hybrid algorithm—A combinatorial meta-problem", Annals of Mathematics and Artificial Intelligence, vol. 34, pp. 259-269, 2002.

Andrew B. Baker, Intelligent Backtracking on the Hardest Constraint Problems, Feb. 6, 1995.

Laura Barbulescu, L. Darrell Whitley, and Adele E. Howe, Leap Before You Look: An Effective Strategy in an Oversubscribed Scheduling Problem. In Proc. AAAI'04, San Jose, CA, pp. 143-148, 2004.

Roberto J. Bayardo Jr., and Daniel P. Miranker, A Complexity Analysis of Space-Bounded Learning Algorithms for the Constraint Satisfaction Problem, In Proceedings of the Thirteenth National Conference on Artificial Intelligence, pp. 298-304, 1996.

J. Christopher Beck and Mark S. Fox, Dynamic Problem Structure Analysis as a Basis for Constraint-directed Scheduling Heuristics, In Proceedings of the Thirteenth National Conference on Artificial Intelligence, Artificial Intelligence, vol. 117, pp. 31-81, 2000.

Romuald Debruyne, Arc-Consistency in Dynamic CSPs Is No More Prohibitive, In Proc. 8th Conference on Tools with Artificial Intelligence, pp. 299-306, 1996.

Bistra Dilkina, Lei Duan, and William S. Havens, Extending Systematic Local Search for Job Shop Scheduling Problems, In Proceedings of the Eleventh International Conference on Principles and Practice of Constraint Programming, Sitges, Spain, Oct. 1, 2005, pp. 762-766.

K.A. Dowsland, Simulated Annealing, Ch. 2, Modern Heuristic Techniques for Combinatorial Problems, ed. C.R. Reeves, John Wiley & Sons, 1993.

Matthew L. Ginsberg, Dynamic Backtracking, Journal of Artificial Intelligence Research 1, pp. 25-46, 1993.

Fred Glover, Tabu Search Fundamentals and Uses, Jun. 1995.

William S. Havens, NoGood Caching for MultiAgent Backtrack Search, In Proc. AAAI'97 Constraints and Agents Workshop, Providence, Rhode Island, 1997.

William S. Havens and Bistra N. Dilkina, A Hybrid Schema for Systematic Local Search. In Advances in Artificial Intelligence Proceedings of the 17th Conference of the Canadian Society for Computational Studies of Intelligence 2004, Springer-Verlag, pp. 248-260.

H. Hoos and T. Stutzle, Stochastic Local Search: Foundations and Applications, presentation from AAAI-04 Tutorial, 2004.

Eric Horvitz and Tim Paek, A Computational Architecture for Conversation, in Proc. Of the Seventh International Conference on User Modeling, Banff, Canada, Jun. 1999, New York: Springer Wien, pp. 201-210.

ILOG JSolver 2.0 Beta User's Manual, ILOG SA, France, Jul. 2002.

Narendra Jussein, Romuald Debruyne, and Patrice Boizumault, Maintaining Arc-Consistency within Dynamic Backtracking. In Sixth International conference on Principles and Practice of Constraint Programming (CP'2000), Sep. 2000, pp. 249-261.

Narendra Jussein and Vincent Barichard, The PaLM System: Explanation-based Constraint Programming. In Proceedings of TRICS: Techniques for Implementing Constraint Programming Systems, a post-conference workshop of CP'2000, pp. 118-133, 2000.

Narendra Jussein and Olivier Lhomme, Local Search With Constraint Propagation and Conflict-based Heuristics, Artificial Intelligence 139(1):21-45, 2002.

Francois Laburthe, Choco: Implementing a CP Kernel, Proceedings of TRICS: Techniques for Implementing Constraint Programming Systems, a post-conference workshop of CP'2000. In Proceedings CP2000, Lecture Notes in Computer Science series, vol. 1894, Singapore 2000.

Claude Le Pape, Implementation of Resource Constraints in ILOG Schedule: A Library for the Development of Constraint-Based Scheduling Systems, Intelligent Systems Engineering 3(2), pp. 55-66, Summer 1994.

Alan K. Mackworth, Consistency in Networks of Relations, Artificial Intelligence, vol. 8, 99-118, 1997.

Laurent Michel and Pascal Van Hentenryck, A Constraint-Based Architecture for Local Search. In Proc. ACM Conference on Object-Oriented Programming, Systems, Languages, and Applications, Seattle, WA, pp. 83-100, 2002.

Steven Minton, Mark D. Johnston, Andrew B. Philips, and Philip Laird, Minimizing Conflicts: A Heuristic Repair Method for Constraint-Satisfaction and Scheduling Problems, Artificial Intelligence 58(1-3), pp. 161-205, 1992.

Matthew W. Moskewicz, Conor F. Madigan, Ying Zhao, Lintao Zhao, and Sharad Malik, Chaff: Engineering an Efficient SAT Solver. In Proceedings of the 38th Design Automation Conference (DAC '01), Jun. 2001, pp. 530-535.

Samir Ouis, Narendra Jussein, and Patrice Boizumault, COINS: A Constraint-based Interactive Solving System. In ICLP'02 12tth Workshop on Logic Programming Environments, pp. 31-46, Jul. 12, 2002.

Steven Prestwich, Local Search and Backtracking vs. Non-Systematic Backtracking. In Proc. AAAI 2001 Fall Symposium on Using Uncertainty within Computation, 2001, pp. 109-115.

Patrick Prosser, Hybrid Algorithms for the Constraint Satisfaction Problem, Computational Intelligence, vol. 9, No. 3, 1993.

Bart Selman, Henry A. Kautz, and Bram Cohen, Noise Strategies for Improving Local Search. In Proceedings of 12th National conference on Artificial Intelligence (Seattle, WA), pp. 337-343, Jul. 1994.

Greg Sidebottom and William S. Havens, Hierarchical Arc Consistency for Disjoint Real Intervals in Constraint Logic Programming, Computational Intelligence 8(4), National Research Council of Canada, pp. 601-623, 1991.

Paul Shaw, Bruno De Backer, and Vincent Furnon, Improved Local Search for CP Toolkits, Annals of Operations Research 115, pp. 31-50, 2002.

Pavel Surynek and Roman Bartak, A New Algorithm for Maintaining Arc Consistency after Constraint Retraction, Lecture Notes in Computer Science, vol. 3258/2004, Springer-Berlin, pp. 767-771, 2004.

Christian Bessiere and Jean-Charles Regin, Refining the Basic Constraint Propagation Algorithm. In Proceedings of IJCAI-01, pp. 309-315, Seattle, Washington, 2001.

B. Neveu, P. Berlandier, Maintaining Arc Consistency Through Constraint Retraction. In Proc. IEEE International Conference on Tools for Artificial Intelligence (TAI), pp. 426-431, New Orleans, LA, 1994.

Jean-Charles Regin, A Filtering Algorithm for Constraints of Difference in CSPs. In Proceedings of the Twelfth National conference on Artificial Intelligence, vol. 1, pp. 362-367, 1994.

Christian Schulte and Peter J. Stuckey, Speeding Up Constraint Propagation. In Proceedings of CP 2004, Lecture Notes in Computer Science series, vol. 3258, pp. 619-633, 2004.

Ines Lynce and Joao P. Marques-Silva, An Overview of Backtrack Search Satisfiability Algorithms, Annals of Mathematics and Artificial Intelligence, vol. 37, pp. 307-326, 2003.

George Katsirelos and Fahiem Bacchus, Unrestricted Nogood Recording in CSP Search, CP 2003, pp. 873-877, 2003.

* cited by examiner

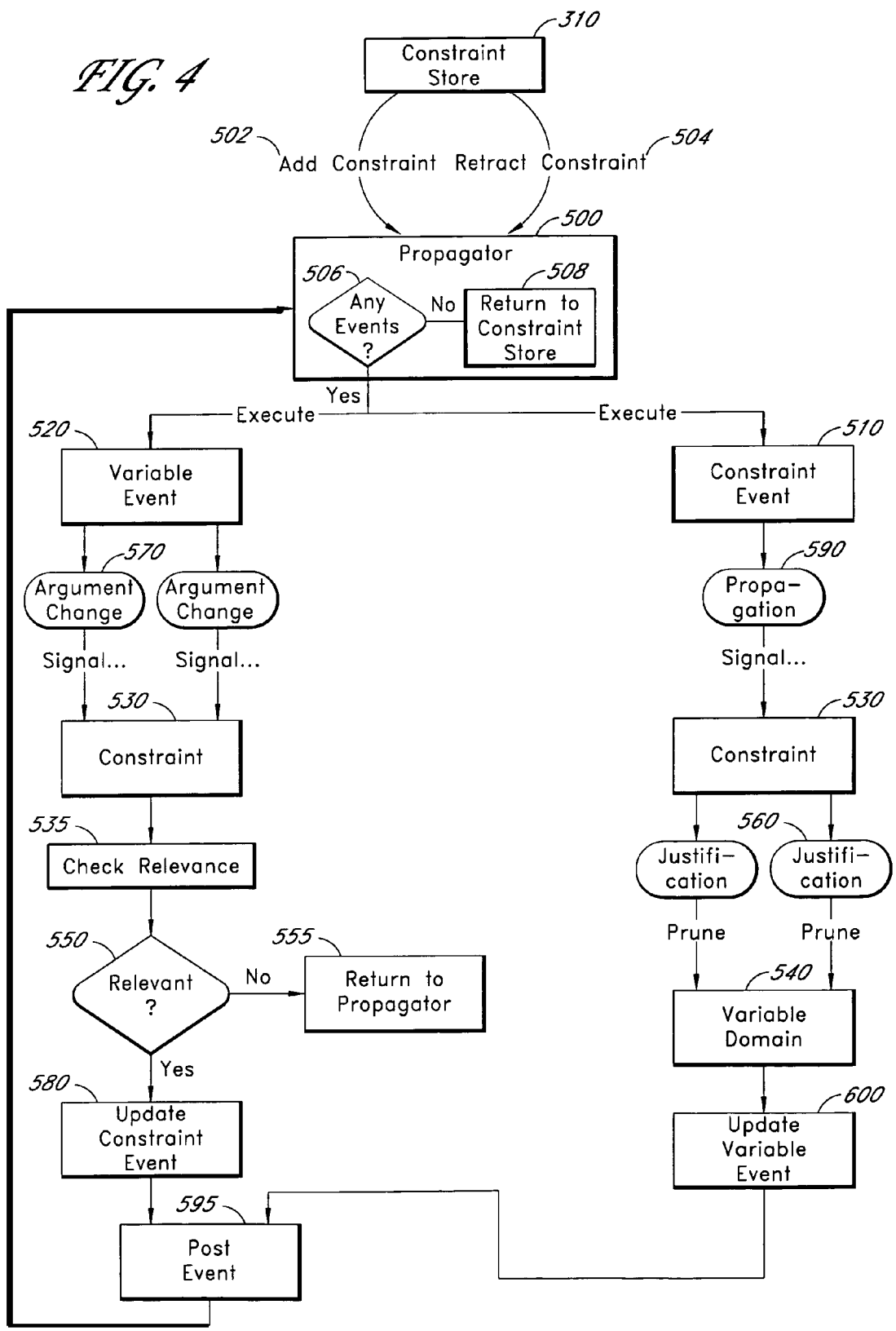

FLEXIBLE CONSTRAINT PROPAGATION ENGINE FOR COMBINATORIAL OPTIMIZATION APPLICATIONS

RELATED APPLICATIONS

The present application claims benefit under 35 U.S.C. § 119(e) of U.S. Provisional Patent Application No. 60/721,201, filed Sep. 28, 2005, entitled FLEXIBLE CONSTRAINT PROPAGATION ENGINE FOR COMBINATORIAL OPTIMIZATION APPLICATIONS, which is hereby incorporated by reference herein in its entirety.

BACKGROUND OF THE DISCLOSURE

1. Field of the Disclosure

The present disclosure relates to search engines for solving combinatorial optimization problems, and more particularly, relates to computer-implemented methods and software architectures for implementing constraint propagation and retraction algorithms.

2. Description of the Related Art

Constraint Programming (CP) methods are applicable to solving hard combinatorial optimization problems such as scheduling, planning, configuration, routing, resource allocation, timetabling, and rostering. Constraint propagation, which is a central technology employed in many CP systems, uses the constraints defined in a given problem model to greatly reduce the size of the search space that is searched to find solutions to a combinatorial optimization problem. Since the size of the search space for combinatorial problems is generally exponential in the size of the problem (e.g., the number of variables in the problem model), reducing the size of this search space using constraint propagation algorithms is frequently essential for solving large problems where a significant fraction of the points in the search space may need to be visited in order to find a solution.

An effective approach for speeding up search is to reduce the search space as much as possible after every step of the search. Constraint propagation enforces a certain level of constraint consistency that results in a smaller search space. Typically in constraint programming, constraint propagation is intermixed with a search method that is used to derive new constraints. These new constraints are then propagated by the constraint propagation algorithm. The intended result is to reduce the search space as the search method explores those regions of the search space which remain after constraint propagation.

Many constraint propagation methods use variants and enhancements of the arc consistency (A/C) algorithm (see, e.g., [Mackworth77]). It is known that use of the A/C algorithm mathematically guarantees that every value in the domain of a variable is allowed by the constraints on this variable, given the current domains of the other variables in the problem model. Values removed by the A/C algorithm are not part of any feasible assignment of the variables under the constraints of the problem model. However, not every value remaining in the domain after use of A/C is necessarily part of a feasible complete solution. Accordingly, a search must still be performed to find actual feasible solutions from within the reduced search space.

Arc-consistency defined for constraints that involve more than two variables is called generalized arc-consistency. A Constraint Satisfaction Problem (CSP) is generalized-arc-consistent (or "hyper arc-consistent") if:

for every variable x in V,
and every constraint c(x, y1, ..., yn) involving x,
for every value d in the domain of x, D(x)
there are values d1, ..., dn in D(y1), ..., D(yn)
such that c(d, d1, ..., dn) is true (equivalently, the tuple (d, d1, ..., dn) is in c).

In the CP literature, the A/C enforcing mechanism variously consists of activating a constraint and computing an arc-consistent state after one or several value removals and hence the global propagation loop is directed by constraints (constraint-centered). Alternatively, the global propagation loop is driven by domain reductions (variable-centered).

Traditional monotonic constraint propagation (such as arc-consistency and its variants) is an important part of a CP system, and well-understood and efficient algorithms are known (see, e.g., [Bessiére01]). Monotonic constraint methods typically remove values from the domains of variables that do not satisfy the constraints on these variables.

Non-monotonic constraint propagation methods, like monotonic constraint propagation methods, can remove values that do not satisfy the constraints. However, unlike monotonic methods, non-monotonic methods are also able to put back values into variable domains if the constraints on those variables are retracted. Non-monotonic constraint propagation is less well developed, and the complexity of non-monotonic algorithms generally is greater than monotonic constraint propagation algorithms. Combinatorial optimization applications in which a problem changes dynamically, as well as Mixed-Initiative (MI) applications in which the user interacts with the system, can be equivalent to the addition and/or retraction of constraints in the problem model. The run-time performance and search memory needed for constraint propagation and/or retraction can vary greatly for different implementations of non-monotonic methods.

Constraint retraction is a widely used technique in non-monotonic constraint propagation methods. Constraint retraction may occur in a search during backtracking and user interaction and in dynamic problems. If a constraint is retracted, domain reduction that has occurred directly or indirectly due to the presence of the retracted constraint is undone by the system. Different dynamic constraint retraction algorithms have different implementation difficulty, memory requirements, and running efficiency (see, e.g., [Neveu94] and [Bartak04]). Each algorithm has particular advantages and disadvantages and can be selected for use by the constraint propagation engine to suit specific requirements of a combinatorial optimization application.

The CHOCO algorithm, for example, utilizes an event-based constraint propagation algorithm (see, e.g., [Laburthe00]). During propagation, each time a variable domain is reduced (called a variable event), the constraints involving that variable are processed, and in turn, these constraints generate new variable events thus removing more values from the domains of their argument variables. The CHOCO algorithm considers the following propagation events for finite domain variables:

INCINF: the domain lower bound is increased
DECSUP: the domain upper bound is decreased
INSTANTIATE: the domain is reduced to a single value
REMOVAL: some value a is removed from the domain All variable events in the CHOCO algorithm have the same life-cycle: they are first generated, then the domain modification is applied, then they are stored in an event queue, and finally they are removed from the queue and executed by awakening the corresponding constraints (except the one that caused the event). At run-time, this life-cycle can stop at the domain modification step if the event does not add new information to the current status of the domain (i.e. does not change it). When a constraint is awakened, it can either be immediately propagated or delayed until all variable events have been processed. Thus propagation can be either variable-directed or constraint-directed.

There are different strategies for performing constraint propagation. For example, in a Depth-First Search, when a variable event is executed, all children variable events resulting from the constraint propagation are propagated before other pending variable events. In contrast, in a Breadth-First Search, variable events are propagated by generation. The choice of the CP strategy will depend on the combinatorial optimization application. For example, in the CHOCO algorithm, all INSTANTIATE events are stored in a Last-In-First-Out (LIFO) queue, all REMOVAL events are stored in a separate First-In-First-Out (FIFO) queue, and all INCINF and SUPINF events are stored in another FIFO queue. The order of propagation then is defined as follows: 0) all INSTANTIATE events; 1) all REMOVAL events; 2) all INCINF and DECSUP events; 3) all touched constraints defined explicitly as feasible tuples; 4) all delayed constraints with linear runtime; 5) all delayed constraints with sub-quadratic runtime; 6) all delayed constraints with quadratic runtime; and 7) all delayed constraints with higher complexity runtime. Since global constraints are often awakened after several variable events have occurred, such constraints need to take a global view of what has changed; hence global constraints consider the changes as an abstract event (e.g., "something has changed"). Some global constraints have special abstract events which contain more detailed information.

Previous constraint programming systems have selected a particular constraint propagation architecture and have hard-wired it into a search engine (also known as a reasoning engine). Some systems use constraint-centered methods and others use variable-centered methods. Naive implementations of the CP architecture may be very inefficient. Recent work on the CHOCO constraint programming system takes some advantage of propagating constraints in an intelligent order depending on their domain reduction power (see, e.g., [Laburthe00]). Researchers have studied the effectiveness of implementing different constraint propagation strategies (see, e.g., [Schulte04]); however, these strategies also have been hard-coded into the search engine.

When new propagation strategies are added, the internal code of the search engine at the very lowest levels must be reprogrammed. For example, this was the experience of researchers who implemented the PALM system on top of the CHOCO kernel (see, e.g., [Jussein00b]). The PALM extension to CHOCO incorporated non-monotonic propagation To integrate new functionality into CHOCO to support non-monotonic propagation, the researchers needed to extend all variable classes to include explanations. In addition, the behavior of all constraints in CHOCO needed to be specialized in order to add explanation computation code and to add a method that provides an explanation for every domain modification that the constraint performs.

SUMMARY

The present disclosure describes a computer-implemented constraint propagation system that supports a variety of different constraint propagation and/or constraint retraction algorithms, including both monotonic and non-monotonic algorithms. In one embodiment, the system selects particular constraint propagation and/or retraction methods based on the nature of the combinatorial optimization problem (COP) being solved and the attributes of the particular COP application involved. The system may also enable new methods for constraint propagation and/or retraction to be added with relatively little disruptive effect on other components of the system. Embodiments of the system allow the propagation of constraints to be tuned to the semantics of each constraint, the likelihood of significant variable domain reduction, and other problem specific properties.

Embodiments of the constraint propagation system provide a flexible, reconfigurable propagation engine that can support at least several alternative constraint propagation and/or retraction methods. For example, embodiments of the system support a variety of constraint propagation and retraction algorithms that can depend on the needs of the application at hand. In some embodiments, the constraint propagation system supports an efficient, non-monotonic flexible constraint propagation engine. Non-monotonic constraint propagation methods, which may be used for dynamic constraint optimization problems (COPs) and Mixed-Initiative (MI) applications, may be implemented with the constraint propagation system. The constraint propagation system disclosed herein is capable of being used with a reconfigurable search engine.

The constraint propagation system may provide other benefits as well. For example, the constraint propagation and/or retraction methods can be selected to reduce memory storage requirements and to improve processor performance. Additionally, by supporting integration of new propagation/retraction techniques with minimal re-programming of existing system architecture, the constraint propagation system increases system reliability and reduces the likelihood of security vulnerabilities.

An embodiment of a constraint propagation system for use with a search engine configured to search for solutions to a combinatorial optimization problem is disclosed. The system comprises a constraint system configured to store in a computer memory information related to at least one constraint of a combinatorial optimization problem and to provide at least one message related to the at least one constraint. The message comprises at least one of an add constraint message and a retract constraint message. The combinatorial optimization problem comprises variables and constraints that specify a relationship among one or more of the variables. The constraint propagation system also comprises a propagator system configured to receive the at least one message from the constraint system and to execute, in a computer processor, constraint propagation instructions in response to the received message. The constraint propagation instructions include instructions for processing at least one of a variable event and a constraint event. A variable event represents a change to a value or a domain of a variable, and a constraint event represents a change to a value or a domain of a variable associated with the constraint.

An embodiment of a method for constraint propagation in a search engine configured to search for a solution of a combinatorial optimization problem is disclosed. The constraint propagation method comprises communicating to a propagation processor information relating to an event associated with a solution of a combinatorial optimization problem. The event comprises at least one of a variable event and a constraint event. A variable event represents a change to a value or a domain of a variable, and a constraint event represents a change to a value or a domain of a variable associated with the constraint. The method also comprises, in response to the information, executing instructions related to the event by the propagation processor, wherein the instructions comprise at least one of variable event instructions and constraint event instructions. A computer-readable medium may comprise computer-executable instructions embodying the method.

An embodiment of a computer-implemented method for configuring a constraint propagation engine comprises receiving combinatorial optimization problem (COP) information relating to a COP model. The COP model comprises a COP type, variables, and constraints. The method further comprises receiving a performance benchmark relating to a constraint propagation method that is usable with a search engine configured to search for a solution to the COP model. The method also comprises configuring a constraint propagation engine for use with the search engine using at least the COP information and the performance benchmark. An embodiment of a search engine is provided that comprises a constraint propagation engine configured according to the method. A computer-readable medium may comprise computer-executable instructions embodying the method.

Neither this summary nor the following detailed description of preferred embodiments is intended to limit the scope of the disclosed invention. The invention is defined by the claims and their equivalents.

BRIEF DESCRIPTION OF THE DRAWINGS

FIG. 4 is a block diagram that schematically illustrates an embodiment of a flexible constraint propagation engine.

Reference symbols are used in the figures to indicate certain components, features, and aspects shown therein, with reference symbols common to more than one figure generally indicating like components, features, or aspects.

DETAILED DESCRIPTION OF PREFERRED EMBODIMENTS

Certain specific embodiments of the invention will now be described in detail with reference to the drawings listed above. These drawings and description of the disclosed embodiments are presented by way of example only, and do not limit the scope of the invention, which extends to alternative embodiments and uses of the invention and to obvious modifications and equivalents thereof. Thus, the scope of the invention is not to be limited to the preferred embodiments described below.

In any method or process described herein, the acts or operations of the method/process are not necessarily limited to any particular disclosed sequence. Also, for purposes of contrasting different embodiments and the prior art, certain aspects and advantages of these embodiments are described herein where appropriate. It should be understood that not necessarily all such aspects and advantages need be achieved in any one embodiment. Thus, it should be recognized that certain embodiments may be carried out in a manner that achieves or optimizes one advantage or group of advantages without necessarily achieving other aspects or advantages that may be taught or suggested herein.

1. OVERVIEW OF A RECONFIGURABLE SEARCH ENGINE

Figure 1:
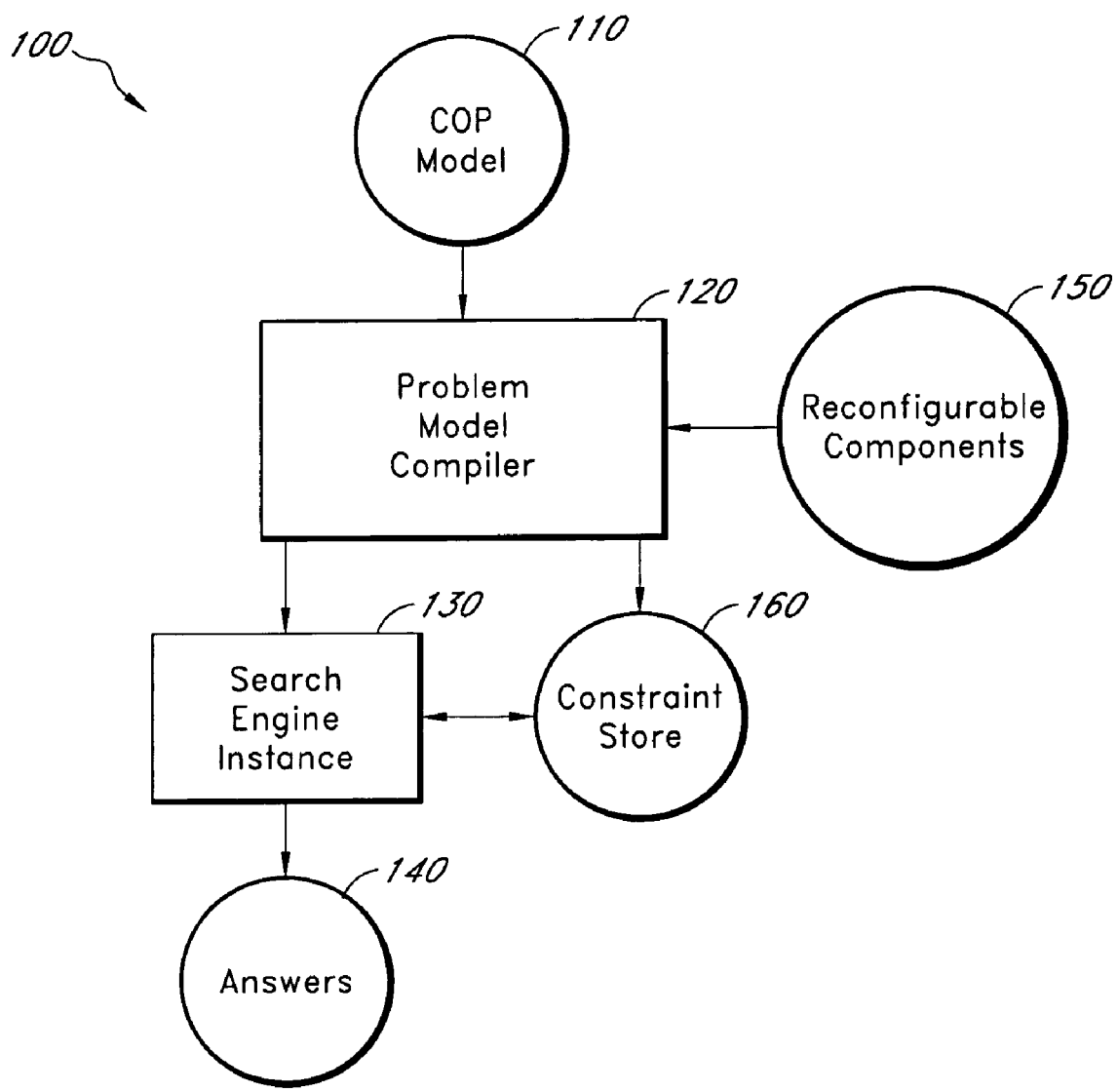
FIG. 1 is a block diagram that schematically illustrates a Reconfigurable Search Engine that can be used to find a solution to a combinatorial optimization problem.

For purposes of providing one example of a search engine system in which the constraint propagation systems and methods of the present disclosure may be used, a Reconfigurable Search Engine 100 will be described with reference to FIGS. 1, 2, and 3. As will be apparent, the disclosed constraint propagation systems and methods are not limited to the Reconfigurable Search Engine 100 shown, but rather are applicable to a wide range of other search engine systems, including systems that are capable of using only a particular type of search method.

A mathematical model of a combinatorial optimization problem (COP) is a formulation of the variables, constraints, and optionally one or more objectives to be optimized. A solution for the COP problem may be found by searching a search space to determine allowed values of the variables that satisfy the constraints and optionally that optimize the objectives. FIG. 1 schematically illustrates a representation of the Reconfigurable Search Engine 100 that can be used to find a solution to a COP Model 110. The Reconfigurable Search Engine 100 comprises a Problem Model Compiler 120, a Search Engine Instance 130, a Constraint Store 160, and a library of Reconfigurable Components 150. A solution is represented by Answers 140. In some embodiments of the Reconfigurable Search Engine 100, the COP Model 110 is analyzed by the Problem Model Compiler 120, which assembles a Search Engine Instance 130 that is customized to the particular COP Model 110. The Search Engine Instance 130 is compiled from the library of Reconfigurable Components 150 so as to implement one (or more) suitable search methods. The Constraint Store 160 comprises a network of constraints and variables compiled by the Problem Model Compiler 120. The network of constraints and variables in the Constraint Store 160 may be compiled using data structures compatible with the internal algorithms of the Search Engine Instance 130. The Search Engine Instance 130 is then run (e.g., executed on a computer or other suitable machine for manipulating data and instructions) using the compiled Constraint Store 160 to produce the Answers 140 to the input COP Model 110.

In some embodiments, the COP Model 110 is represented in a suitable syntactic format such as, for example, an extensible markup language (XML) document. XML advantageously provides the ability to accurately describe very complex relationships among the variables, constraints, and objectives which appear in scheduling, planning, configuration and other COPs. The XML document specifies the variables appearing in the COP Model 110 and their domains of allowed values. The XML document also specifies the constraints between subsets of variables in the COP Model 110, and optionally specifies one or more objectives of the COP to be optimized. Although XML is a convenient and powerful way to specify the COP Model 110, other languages or metalanguages can be used. For example, as an alternative to providing an XML representation of the COP Model 110, a graphical user interface (GUI) may be used that permits a user to provide an input description of the COP to be solved. Alternatively, a customized input language can be defined for a specific application of the Reconfigurable Search Engine 100.

The Answers 140 may also be represented in a suitable syntactic format such as, for example, XML. The Reconfigurable Search Engine 100 does not require XML format, and many other suitable input data representations may be used. For example, the Answers 140 may be displayed in a graphical user interface or used as an input to some other output or display system.

The Reconfigurable Search Engine 100 may be used to solve a COP using one (or more) search methods, including the search methods described above such as, for example, constructive search methods, hybrid search methods, or a combination thereof. A particular Search Engine Instance 130 is composed of reusable and/or reconfigurable components taken from the library of Reconfigurable Components 150. The components in the library may be precompiled. A complete representation of the Search Engine Instance 130 is assembled from this component library for the type of COP being solved. In some embodiments, an Application Programmer's Interface (API) is also provided so that users can optionally define their own reconfigurable components for the Reconfigurable Search Engine 100. Thus the Reconfigurable Search Engine 100 can easily be extended and the new components reused in other applications.

The Problem Model Compiler 120 analyses the input COP Model 110 in order to determine how to select components from the library 150 and to assemble a customized Search Engine Instance 130 and a compatible Constraint Store 160 that can be used to solve the given COP. In some embodiments, the Problem Model Compiler 120 assembles the Search Engine Instance 130 and the Constraint Store 130 in a semi-automated manner with relatively minimal input from the user. An advantage of such embodiments is that the user does need not to understand the details of the assembled components or the internal representation of the Constraint Store 130. Because the Problem Model Compiler 120 substantially handles the compilation of components needed to find the Answers 140, users not versed in the art of constraint programming beneficially can use the Reconfigurable Search Engine 100 to solve difficult COPs and to build customized applications using, e.g., the optional API.

The Reconfigurable Search Engine 100 may provide a broad spectrum of user control over the compilation process. For example, in a novice embodiment or mode, the user may simply utilize the Search Engine Instance 130 which implements a default search method and variable/constraint configuration for the given type of input COP. Alternatively, in a custom embodiment or mode, the user may specify one or more desired search methods and components from the library of Reconfigurable Components 160 to create the Search Engine Instance 130. And in an expert embodiment or mode, the user may add new components to the library of Reconfigurable Components 150 using the API provided so as to implement a novel Search Engine Instance 130. These embodiments and modes are intended as examples only and are not intended to limit the range of possible user control over the compilation process.

Figure 2:
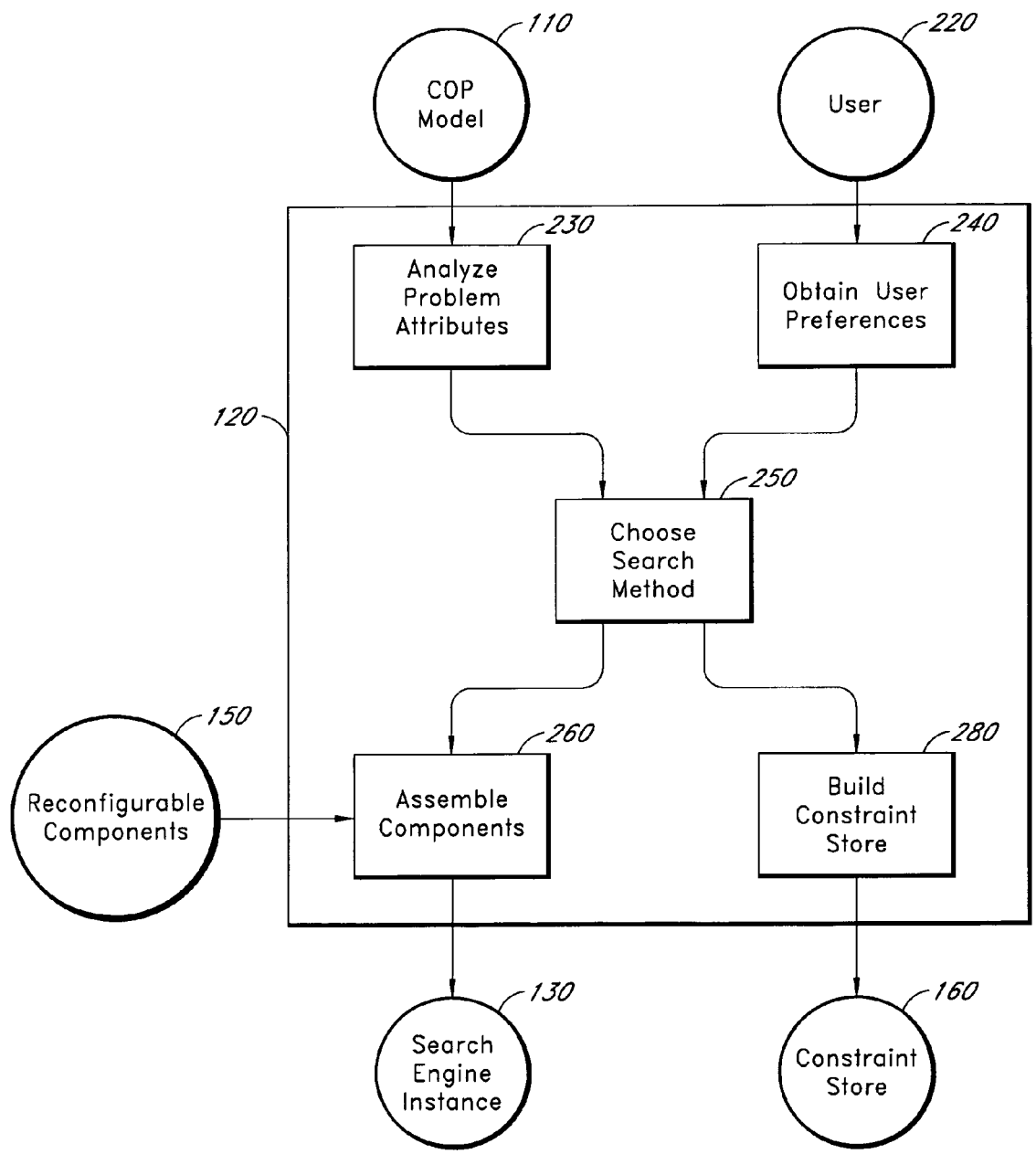
FIG. 2 is a block diagram that schematically illustrates an embodiment of a Problem Model Compiler.

FIG. 2 is a block diagram that schematically illustrates an embodiment of a Problem Model Compiler 120. One input to the Problem Model Compiler 120 is a COP Model 110 to be solved. As described above, the COP Model 110 comprises the variables, constraints, and optionally one or more objectives of the COP. The COP Model 110 is characterized by various Problem Attributes, including the problem type, which specifies the nature of the COP. For example, the COP Model type can be specified as a job shop scheduling problem (JSP), a vehicle routing problem (VRP), a multimode resource scheduling problem (MMRSP), an oversubscribed resource scheduling problem (OSRSP), or many other possible types of scheduling, planning, management, and/or configuration problem. For example, certain COP Model types can be specified as an asset scheduling management problem (ASM), which typically describes a process of controlling utilization of assets in a production chain to provide improved or maximal support for organizational goals. Asset scheduling management problems include, but are not limited to, enterprise asset management problems, computerized maintenance management system problems, supply chain planning problems, and enterprise resource planning problems. The COP Model type is quite general and can be extended to include types and categories of COPs that are now being (or will be) developed.

The Problem Attributes also include attributes of the variables, constraints, and objectives (if provided) of the COP Model 110. The variables of the input COP Model 110 may be characterized by various attributes including, for example, their type (e.g., Boolean, integer, real, etc.) and the domain of possible values that each variable can assume in a feasible solution to the COP. The constraints are characterized by various attributes including their type and the set of variables which they constrain (called their arguments) in the given COP Model 110. The constraints limit the values that can be assigned to the variables in their arguments. Further, each constraint specifies the allowed combinations of values that the argument variables can take on simultaneously. These allowed combinations of values may be represented, for example, syntactically in a table or specified intentionally via a logical formula comprising the argument variables (e.g., a formula in conjunctive normal form). Alternatively, the allowed combinations of values can be computed by a Boolean procedure that returns true if the current assignment of values to the argument variables is consistent under the constraint and false otherwise. In some embodiments, an application programmer's interface (API) is provided and permits a user to define new constraints. These new constraints can then be added to the library of components (e.g., the Constraint Store 160 and/or the Reconfigurable Components 150 shown in FIG. 1) and reused in subsequent applications. In some embodiments, the API advantageously permits a user to define new constraint propagation and/or retraction methods that can be used with the Constraint Store 160, the library of Reconfigurable Components 150, and/or other suitable components in the Reconfigurable Search Engine 100.

In some COP Models 110, the COP Model 110 may include one or more objectives to be optimized. An objective can be characterized by various attributes including, for example, its type and whether its value should be minimized or maximized by the solution of the COP. The Problem Attributes described above are not intended to be limiting, and in other embodiments the Problem Attributes can include other attributes, features, and characteristics of the COP Model 110 that are not described herein.

In various embodiments, the Reconfigurable Search Engine 100 is configured for varying ranges of user input and control. For example, in the embodiment of the Problem Model Compiler 120 shown in FIG. 2, a User 220 can enter or otherwise input through the Obtain User Preferences module 240 a set of user preferences. User preferences can, for example, specify custom components or parameters that the User 220 desires the Problem Model Compiler 120 to account for in assembling a Search Engine Instance 130 and/or a Constraint Store 290. For example, in Mixed-Initiative applications where the user and the system interact during the search to find a solution for the given COP, user preferences may specify the types and amount of interactions desired with the user. For example, in some embodiments, the User 220 may ask for and be provided with explanations of decisions made by the Search Engine Instance 130, or the User 220 may direct the Search Engine Instance 130 into various regions of the search space during the search. In other embodiments, the User 220 may freeze particular aspects of the solution (e.g., the Answers 140), while directing the Search Engine Instance 130 to search the remaining portions of the search space. The user preferences may include user-overrideable default data for various functions, methods, and/or parameters. Many other interactions between the User 220 and a Search Engine Instance 130 are possible.

As shown in FIG. 2, the Problem Model Compiler 120 analyzes the Problem Attributes of the COP Model 110 in the Analyze Problem Attributes module 230. Together with the user preferences (if any) obtained in module 240, the Problem Model Compiler 120 selects an appropriate search method in a Choose Search Method module 250. Having determined an appropriate search method, the Problem Model Compiler 120 in module 260 assembles appropriate components from the library of Reconfigurable Components 150 to produce the Search Engine Instance 130. Many variations of existing search methods and/or new search methods can be realized by the Problem Model Compiler 120 by using existing components (or components added by a user via the API) in the library of Reconfigurable Components 150 either automatically or under a degree of user control. The choice of search method in module 250 determines, at least partially, which data structures are suitable for use in assembling the Constraint Store 160, which is built by the Compiler 120 in module 280.

The Analyze Problem Attributes module 230 shown in FIG. 2 can be realized in many possible ways. In one embodiment, the module 230 associates a default rule for each type of COP Model 110. The Problem Model Compiler 120 in module 260 assembles a suitable Search Engine Instance 130 according to the default rule for that particular class of COP Model 110. For example, if the type of the COP Model 110 is an oversubscribed resource scheduling problem, the Compiler 120 can assemble a Constraint Store 160 and Search Engine Instance 130 using, for example, a permutation scheduling algorithm (e.g., as described in [Barabalescu04]). In another example, if the type of the COP Model 110 is a job shop scheduling problem, the Compiler 120 can assemble a Search Engine Instance 130 using an implementation of a Tabu search algorithm (see, e.g., [Glover93]). In this example, the Compiler 120 (in module 280) can assemble a Constraint Store 160 to represent precedence constraints inherent in the job shop scheduling problem. Besides the examples above, many other customized Search Engine Instances 130 can be compiled by the Problem Model Compiler 120 based on the type of the COP Model 110 and user preferences (input in module 240).

In one embodiment, the Analyze Problem Attributes module 230 utilizes a decision tree algorithm for choosing which search method to use. Branches of the decision tree correspond to the problem attributes of the COP Model 110 determined in module 230, and leaves of the decision tree correspond to specific search methods appropriate for these attributes. The Choose Search Method module 250 uses the leaves decision tree to select a search method. The decision tree may be represented in a suitable syntactic formalism such as, for example, XML, to facilitate development, extension, and maintenance of the Problem Model Compiler 120.

Another embodiment of the Problem Model Compiler 120 uses an Analyze Problem Attributes module 230 that implements one or more Artificial Intelligence (AI) techniques such as, for example, rule-based systems, machine-learning methods, and many other suitable AI techniques. For example, a rule-based system can be used to analyze the problem attributes of the COP Model 110 and the user preferences. In one embodiment, a customized search method is specified by the rule that best matches these attributes and user preferences. The rule-based system can be represented in a suitable syntactic formalism such as, for example, XML to facilitate development, extension and maintenance of the Problem Model Compiler 120.

Based on the particular attributes of the input COP Model 110 and User Preferences 240, the Problem Model Compiler 120 may select from various possible constraint propagation and retraction algorithms provided by the constraint propagation systems disclosed herein. For example, if the application requires Mixed-Initiative (MI) interaction with the user, then a constraint propagation and retraction algorithm which supports explicit explanations for each domain reduction (e.g., as described by [Jussein00b]) may be chosen by the Problem Model Compiler 120. Alternatively, for applications not requiring MI interaction, the Problem Model Compiler 120 may select a non-monotonic constraint propagation and retraction algorithm (e.g., as described in [Bartak04]). The constraint propagation systems described herein may be used in the Build Constraint Store component 280 of the Problem Model Compiler 120 in order to generate a realization of the Constraint Store 160 (see FIG. 2).

The Problem Model Compiler 120 and the modules 230-280 shown and described with reference to FIG. 2 are not limited to these preferred embodiments described above. Many other implementations are also possible.

Figure 3:
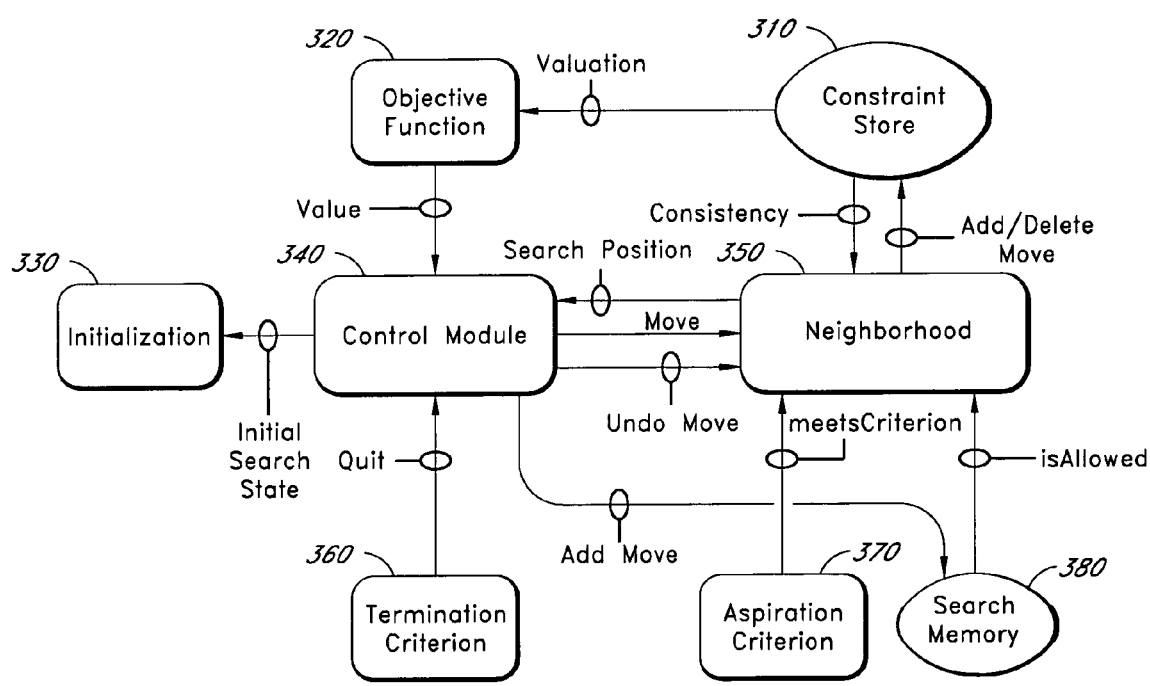
FIG. 3 is a block diagram that schematically illustrates one embodiment of a Reconfigurable Search Engine Instance.

FIG. 3 is a block diagram that schematically illustrates an embodiment of a Search Engine Instance 130 generated by the Reconfigurable Search Engine 100. FIG. 3 shows an Initialization component 330, a Neighborhood component 350, a Search Memory component 380, an Aspiration Criterion component 370, a Termination Criterion component 360, an Objective Function component 320, a Constraint Store component 310, and a Control Module 340. The Constraint Store component 310 may be used to implement the Constraint Store 160 shown in FIGS. 1 and 2. Many different implementations of the Search Engine Instances 130 can be realized using the components shown in FIG. 3 (and other components). Each combination of components produces a distinct Search Engine Instance 130 having various problem solving properties. Some of Search Engine Instances 130 may correspond to known search methods; however, many other new and customizable search methods are also possible. Further details of embodiments of the Reconfigurable Search Engine are found in U.S. Provisional Patent Application No. 60/723,270, filed Sep. 28, 2005, titled "Reconfigurable Search Engine for Combinatorial Optimization Problems," and U.S. patent application Ser. No. 11/529,753, filed Sep. 28, 2006, titled "Reconfigurable Search Engine for Combinatorial Optimization Problems,", the disclosure of each of which is hereby incorporated by reference herein in its entirety.

Certain embodiments of the Reconfigurable Search Engine 100 use the algorithmic concept of iterative improvement, in which a current search state is improved until a satisfactory solution is obtained or no solution can be found. In certain such embodiments, a method by which a Search Engine Instance 130 moves through the search space is controlled by the Neighborhood component 350. The method by which the Neighborhood component 350 systematically avoids repeatedly visiting inconsistent or inferior regions of the search space is mediated by a Search Memory component 380. In some embodiments, the Search Memory component 380 implements one or more "nogood maintenance methods" to keep track of regions of the search space that have already been visited and that contain infeasible and/or inferior solutions to the COP Model 110. In certain embodiments, nogood maintenance methods are implemented in other components or are omitted. The Search Engine Instance 130 evaluates each state in the search using the Objective Function component 320 and determines when to return a solution or halt execution by the Termination Criterion component 360. The Search Engine Instance 130 regulates the flow of control among these (and other) components by the Control Module component 340. By combining these components in various ways, the Reconfigurable Search Engine 100 can construct a Search Engine Instance 130 that implements constructive and/or local search methods using systematic and/or non-systematic search algorithms.

The library of Reconfigurable Components 150 may include the above components (as well as others). The library 150 may include one or more versions of these components, where each version, for example, may have different features or advantages or may implement different methods or techniques. The components (and versions of components) may be implemented using a common interface or protocol, which provides interoperability among the components and substitutability for different versions of components. For example, the components (and versions) may be compiled from a common API (such as the API in Appendix A). The common interface may provide common messaging protocols, memory access protocols, common data structures, etc. The components and versions of components in the library 150 may be provided as, e.g., source code modules, precompiled modules, dynamic link libraries, etc.

The Reconfigurable Search Engine 100 is modular and can be configured to provide a suitable search method for a particular COP. The Problem Model Compiler 120 can select components and/or versions of components from the library of Reconfigurable Components 150 that are interoperable and can be readily assembled into a Search Engine Instance 130 and Constraint Store 160. Components and versions of components may be reused by the Problem Model Compiler 120 to assemble new Search Engine Instances 130. The components (and versions) may be modified and reconfigured for the particular COP application or to implement new features and methods. Users can utilize existing components and versions to create new components. The components and versions of components in the library of Reconfigurable Components 150 accordingly may provide "plug-and-play" capability, allowing them to be reused and/or reconfigured as needed.

In some embodiments, the Search Memory component 380 implements a Nogood Maintenance Method to efficiently track and constrain searches in the search space. Embodiments of the Nogood Maintenance Method can be used with many different Search Engine Instances 130 and in connection with a wide range of different search methods that record regions of the search space inferred to contain no (or relatively few) acceptable solutions to the input COP Model 110. Examples of Nogood Maintenance Methods that can be used are found in U.S. Provisional Patent Application No. 60/719,368, filed Sep. 22, 2005, titled "Nogood Maintenance Methods for Efficiently Tracking and Constraining Searches of a Search Space," and U.S. patent application Ser. No. 11/526,163, filed Sep. 22, 2006, titled "Nogood Maintenance Methods for Efficiently Tracking and Constraining Searches of a Search Space,", the disclosure of each of which is hereby incorporated by reference herein in its entirety.

The systems and components shown in FIG. 3, including the Constraint Store component 310, can be implemented on a variety of types of computing systems, including systems that are distributed on a local or wide area network. In some embodiments, the Search Memory component 380 comprises all or a portion of a computer memory such as, for example, a disk drive, a solid state memory array, or an optical drive (such as a CD or DVD drive). It is contemplated that embodiments of the Search Memory component 380 can be implemented in any type of machine-readable storage medium. Some or all portions of such storage devices may be local or remote to the computer system on which the Reconfigurable Search Engine 100 is implemented. The Search Memory component 380 can also include a processing system, which communicates with computer memory, and which executes computer program instructions.

The Flexible Constraint Propagation Engine and the Reconfigurable Search Engine 100, including the methods described herein, may be implemented in software code modules executed by one or more general or special purpose computers or processors. These code modules may be stored by any type of computer-readable medium or computer storage device. Some or all of the disclosed methods and components may alternatively be implemented in-whole or in-part using special-purpose hardware, including but not limited to application-specific integrated circuits (ASICs), field-programmable gate arrays (FPGAs), and/or programmable logic devices (PLDs). The Reconfigurable Search Engine 100 and the FCPE may utilize additional and/or different components than described herein. For example, in some embodiments, several components may be combined so that their functions and processes are implemented in a single processor or software module, while in other embodiments, their functions and processes may be shared among several different processors and/or software modules.

2. FLEXIBLE CONSTRAINT PROPAGATION ENGINE

In certain embodiments, the constraint propagation system and methods described herein are implemented as a Flexible Constraint Propagation Engine (FCPE) included in the Reconfigurable Search Engine 100 described above. The FCPE may be used to define the method utilized by the Constraint Store component 310 (see FIG. 3) to realize the propagation and/or retraction of constraints. The FCPE is capable of managing the search space represented by the constraints and variables contained in the compiled Constraint Store component 310 by employing various combinations of constraint propagation and constraint retraction algorithms. However, many algorithms have various desirable and undesirable properties, which depend on the type of the Problem Model 110 being solved and its particular representation in the Constraint Store component 310. The FCPE advantageously can be reconfigured to use the most appropriate constraint propagation algorithm and/or retraction algorithm for a given application and given input COP Model 110. Some embodiments of the FCPE are modular and can use different search algorithms alternatively or in combination. In some embodiments, the FCPE uses a flexible event-based architecture.

FIG. 4 is a block diagram that schematically illustrates one embodiment of the Flexible Constraint Propagation Engine. The Propagator 500 may be a reconfigurable component of the FCPE and may be used to realize many possible constraint propagation algorithms. Various implementations of the Propagator 500 are possible corresponding to known constraint propagation algorithms as well as new, previously unknown constraint propagation algorithms. A user of the Reconfigurable Search Engine 100 can realize a particular implementation of the FCPE by specifying a particular Propagator 500 from a library of such components (which may include reconfigurable components from the Library of Reconfigurable Components 150 shown in FIGS. 1 and 2).

In some embodiments, new components of the Propagator 500 can be defined using an API provided with the FCPE. An example API that may be used with the FCPE shown in FIG. 4 is included in Appendix A, which forms part of the disclosure of this specification. The example API in Appendix A includes main interface classes CWAcPropagationEngine and CWAcNonmonotonic-PropagationEngine. The API also includes subclasses CWAcPropagationEvent, with implementing classes CWAcConstraintEvent and CWAcVarEvent, and with related classes CWJustification and CWExplanation. Embodiments of the constraint propagation system that include an API advantageously allow a user who is unfamiliar with data structures and search algorithms to create new instances of the FCPE.

In the embodiment shown in FIG. 4, the Propagator 500 accepts Add Constraint messages 502 and Retract Constraint messages 504 from the Constraint Store component 310 of the Reconfigurable Search Engine 100 (see FIG. 3). When the Propagator 500 receives an Add Constraint message 502, it adds a Constraint Event 510 to a queue which represents that the new constraint is to be evaluated in the Constraint Store component 310. This Constraint Event 510 will then be executed in turn with other events by the Propagator 500. Other embodiments of the Propagator 500 may be configured to accept different constraint messages from the Constraint Store component 310.

If the Propagator 500 receives a Retract Constraint message 504, its actions depend on the particular propagator component implemented in the FCPE. Some embodiments of the FCPE support non-monotonic constraint propagation and/or retraction methods. Based on its event-based architecture, the Propagator 500 has well-defined behavior for many constraint propagation/retraction methods, and a particular implementation of the Propagator 500 can utilize one or more of these methods. Certain embodiments of the invention permit the Reconfigurable Search Engine 100 to select the propagation and/or retraction methods depending upon the characteristics of the COP, the characteristics of the COP Problem Model 110, the characteristics of the constraints associated with the COP, and/or other suitable information including, e.g., run-time performance and storage device requirements of the propagation/retraction methods. The choice of which algorithm or combination of algorithms is appropriate may be made by the Problem Model Compiler 120 based on a set of rules and user preferences (if provided). Since there may be relatively significant differences in performance of various algorithms depending on the application, the FCPE shown in FIG. 4 can select a suitable algorithm in order to improve a performance benchmark related to, for example, computational run-time performance or search memory requirements. Accordingly, the FCPE disclosed herein provides flexibility in selecting an appropriate monotonic, non-monotonic, and/or other constraint propagation algorithm for a particular application.

In the embodiment shown in FIG. 4, the Propagator 500 accepts postings of events of two types: Constraint Events 510 and Variable Events 520. These events may be posted, for example, by evaluation of constraints or by the addition and/or retraction of constraints in the Constraint Store component 310 (as described below). In block 506, the Propagator 500 determines whether there are any events that have not been processed. If there are no more events, in block 508, control returns to the Constraint Store component 310. If there are more events, the Propagator 500 selects an event, either a Constraint Event 510 or a Variable Event 520, to be executed. Some embodiments of the Propagator 500 are configured to accept postings of just a Constraint Event 510 or just a Variable Event 520, while other embodiments are configured to accept postings of both a Constraint Event 510 and a Variable Event 520. The Propagator 500 may also be configured to accept other types of events (e.g., as described above). Many variations are possible.

In some embodiments, the execution of a Variable Event 520 signals an Argument Change 570 to every Constraint 530 whose argument variables are associated with the Variable Event 520. A Variable Event 520 typically records changes to the Variable Domain such as, for example, whether an interval lower bound is refined, whether a value is removed, whether an interval upper bound is refined, or some combination of these changes. FIG. 4 schematically illustrates an example Variable Event 520 comprising two Argument Changes 570; however, fewer or more Argument Changes 570 may occur in other situations. Information related to Variable Events 520 may allow some Constraints 530 to efficiently process the change. For example, if a constraint between variables A and B is the inequality: A>B, then some argument changes such as, e.g., refinement of the lower bound of the variable A, do not require further processing.

If a Variable Event 520 signals an Argument Change 570 to a Constraint 530, in block 535 the Constraint 530 determines whether this Variable Event 520 is relevant to the Constraint 530. A Variable Event 520 is relevant if and only if the changes recorded within the Variable Event 520 could cause the Constraint 530 to modify the Variable Domains of the its argument variables in the Constraint Store component 310. If the Variable Event 520 is relevant, then in block 580 the Constraint 530 updates its Constraint Event, which in block 595 is then posted back to the Propagator 500 for execution. If in block 550 the Variable Event 520 is determined to be irrelevant to the Constraint 530, no further constraint processing occurs for this event, and in block 555 the process returns to the Propagator 500 to process any remaining events.

When the Propagator 500 selects a Constraint Event 510 for execution, the Constraint Event 510 signals Propagation 590 to its associated Constraint 530. Constraint Events 510 typically comprise information regarding whether an argument variable of the associated Constraint 530 has been changed by the Constraint Store component 310. If only a single argument variable changes, the Constraint Event 510 remembers the particular Variable Event 520. In this case, it is preferred, but not necessary, for every Constraint 530 in the Constraint Store component 310 to implement an efficient procedure, which can take advantage of the details of the Variable Event 520, to evaluate the domain change of only the single argument variable.

However, if more than a single argument has changed, the Constraint 530 may apply the above-described single variable procedure for each changed variable or it may apply a global procedure taking all the variable changes into account. The signaled Constraint 530 applies its internal algorithm to reduce (or prune) some of the Variable Domains 540 of its argument variables in the Constraint Store.

Each type of Constraint 530 may have a specialized internal algorithm for updating the Variable Domains of its argument variables. In the embodiment shown in FIG. 4, when a Constraint 530 reduces (or prunes) a Variable Domain corresponding to an argument variable, the FCPE provides Justifications 560 that represent a reason that the Variable Domain 540 has been reduced by constraint propagation. A Justification may be represented by a data structure, which specifies the reason for the Variable Domain reduction. The contents of the Justifications 560 generally are specific to the Propagator 500 implemented in the embodiment of the FCPE. Although two Justifications 560 are shown in FIG. 4, fewer or more Justifications 560 may be used in other instances. In some methods, the Variable Domain records the Justification 560, which contains sufficient information about the reduction so that the effects of the constraint evaluation advantageously can be later removed if some or all of the information contained in the Justification 560 becomes invalid. Related techniques may be used (see, e.g., [Laburthe00]). If the constraint evaluation algorithm modifies a Variable Domain, the FCPE, in block 600, updates the Variable Event 520 corresponding to the appropriate variables. After the Variable Event 520 is updated in block 600, the event in block 595 is posted back to the Propagator 500. In some embodiments, the Propagator 500 executes the Variable Event 520 soon after its posting, while in other embodiments, the Propagator 500 adds the Variable Event 520 to a queue for later execution. In embodiments utilizing a queue, the Processor 500 may select the Variable Event 520 from the queue for execution in order to improve or maximize efficiency of the constraint propagation process.

In some embodiments, the Propagator 500 maintains one or more queues for efficiently processing Variable Events 520, Constraint Events 510, or both types of events. The Propagator 500 can select either a Variable Event 520 or a Constraint Event 510 for execution as described above. Various heuristics for making this selection are known and may be implemented in embodiments of the FCPE. For example, a constraint-centered FCPE can be implemented in which Variable Events 520 are executed immediately by the Propagator 500, while Constraint Events 510 are queued for execution. Additionally or alternatively, Constraints 530 can be queued according to a priority corresponding to, for example, their expected computational complexity, their importance in the search, and/or their domain reduction power. For example, it may be advantageous to process cheaper and/or stronger Constraints 530 first. Embodiments of the FCPE using heuristic propagation order can improve the run-time performance of the constraint propagation system (see, e.g., [Schulte04]).

Various constraint retraction algorithms may be provided by embodiments of the FCPE shown in FIG. 4. For example, in one embodiment, the FCPE delegates creation of Justifications 560 for Variable Domain changes to the implemented Propagator 500. In some embodiments, Justifications 560 are used that contain no recorded information about changes to the Variable Domain. Upon constraint retraction, all Variable Domains 540 that are transitively dependent on the retracted constraint are restored. This transitive dependency generally is a function of the particular instance of the Constraint Store component 310. In such embodiments, there may be a tradeoff between using fewer memory resources and using more computational power.

In another embodiment, the FCPE uses an AC|DC-2 retraction algorithm (see, e.g., [Bartak04]). This algorithm represents the Justification 560 for a change of Variable Domain 540 according to the Constraint 530 that reduced the Variable Domain 540. Thus, on constraint retraction, a Propagator 500 using the AC|DC-2 algorithm can restore only changes to the Variable Domain 540 that were caused by the retracted Constraint 530 or by some or all of the dependent Constraints 530. This alternative algorithm advantageously requires only constant memory space for every Variable Domain 540 change. To realize the AD|DC-2 constraint retraction method, some embodiments of the Propagator 500 add a new Variable Event 520 for each argument variable of the Constraint 530 in the Constraint Store component 310. When executed, each such added Variable Event 520 is able to fully restore the Variable Domain 540 of its corresponding variables.

In another embodiment, Justifications 560 are stored as complete explanations for Variable Domain 540 changes. For example, in one such method transitively all Constraints that contributed to causing this change are processed (see, e.g., [Jussien00b]). Typically, additional memory is required by this method, but upon Constraint retraction, only the Variable Domain 540 changes which have Justifications 560 that contain the retracted Constraint 530 need to be restored. A benefit of such embodiments is that they generally require substantially little additional computational processing.

Additional approaches can also be easily implemented using the Flexible Constraint Propagation Engine described herein. For example, different constraint propagation methods may be desirable for Mixed-Initiative (MI) systems than for stand-alone optimization systems. For example, MI systems typically explain to the user choices including, but not limited to, the causal justification for a particular decision, the reason a particular answer to a COP is infeasible, or the set of assumptions made during a particular search. Such explanations may be provided by the constraint propagation system. The construction and maintenance of explanations may be computationally expensive but important for MI reasoning. However, there generally is little need for explanations in stand-alone optimization systems. In such systems, it is advantageous to use a more efficient, but less informative, non-monotonic constraint propagation algorithm. An advantage of the FCPE described herein is that it may be configured to use many different constraint Propagators 500 within a particular architecture.

3. CONCLUSION

The present disclosure provides constraint propagation systems and methods, which can include a Flexible Constraint Propagation Engine. Embodiments of the Flexible Constraint Propagation Engine described herein can advantageously be used with a Reconfigurable Search Engine. Various embodiments of the constraint propagation systems and methods and the FCPE provide some or all of the following features and benefits, as well as others.

1. Modular constraint propagators. Different types of constraint propagation algorithms can be specified depending on the requirements of the application. Computationally expensive or memory intensive algorithms may be avoided if their functionality is not required by the application.

2. Extensible propagation framework. New propagation algorithms can be easily coded using an API such as, for example, the API included in Appendix A. Newly developed propagation algorithms can be incorporated into embodiments of the FCPE without redesigning the kernel of the FCPE.

3. Efficient customized propagation. Many types of constraint propagation methods can be implemented. For example, both variable-centered and constraint-centered propagation methods can be implemented and freely intermixed. Specialized constraint propagators that process constraints in priority order and/or that avoid processing constraints which will not reduce the search space can be implemented. Constraint propagation efficiency is thereby improved in many combinatorial optimization applications.

4. REFERENCES

The technical disclosures of the following references are hereby incorporated by reference herein in their entirety.

[Baker95] Baker, A. B. (1995) Intelligent Backtracking on Constraint Satisfaction Problems Experimental and Theoretical Results, Ph.D. thesis, Dept. of Computer and Information Systems, Univ. of Oregon.

[Bartak04] Pavel Surynek & Roman Barták (2004). A New Algorithm for Maintaining Arc Consistency after Constraint Retraction. Lecture Notes in Computer Science, Vol. 3258/2004, Springer-Berlin, pp. 767-771.

[Bessiére01] Christian Bessiere and Jean-Charles Regin. (2001) Refining the basic constraint propagation algorithm. In Proceedings of IJCAI-01, pp. 309-315, Seattle, Wash.

[Debruyne96] R. Debruyne (1996) Arc-consistency in dynamic CSPs is no more prohibitive. In Proceedings of the 8th Conference on Tools with Artificial Intelligence (TAI'96), pp. 299-306.

[Laburthe00] François Laburthe and the OCRE project team. CHOCO: implementing a CP kernel, Proceedings of TRICS: Techniques for Implementing Constraint programming Systems, a post-conference workshop of CP 2000. In Proceedings CP'00, Lecture Notes in Computer Science series, Vol. 1894, Singapore 2000.

[Jussien00a] Narendra Jussien, Romuald Debruyne and Patrice Boizumault (2000) Maintaining arc consistency within dynamic backtracking. In Sixth International Conference on Principles and Practice of Constraint Programming (CP'2000), September 2000, pp. 249-261.

[Jussien00b] N. Jussien and V. Barichard (2000) The PaLM system: explanation-based constraint programming. In Proceedings of TRICS: Techniques for Implementing Constraint programming Systems, a post-conference workshop of CP'2000, pp. 118-133.

[Mackworth77] Alan Mackworth (1977). Consistency in Networks of Relations. Artificial Intelligence 8(1): 99-118.

[Neveu94] B. Neveu and P. Berlandier. (1994) Maintaining arc consistency through constraint retraction. In Proc. IEEE International Conference on Tools for Artificial Intelligence (TAI), pp. 426-431, New Orleans, La., 1994.

[Ouis04] S. Ouis, N. Jussein, and P. Boizumault (2004). COINS: a constraint-based interactive solving system. In ICLP'02 12th Workshop on Logic Programming Environments (WLPE'02), pp 31-46.

[Regin94] J.-C. Regin (1994) A Filtering Algorithm for Constraints of Difference in CSPs. In proceedings of the Twelfth National Conference on Artificial Intelligence (AAAI-94), volume 1, pp. 362-367.

[Schulte04] Christian Schulte and Peter J. Stuckey (2004). Speeding Up Constraint Propagation. In Procceedings of CP 2004, Lecture Notes in Computer Science series, Volume 3258, pp. 619-633.

[Sidebottom92] G. Sidebottom & W. S. Havens (1992). Hierarchical Arc Consistency for Disjoint Real Intervals in Constraint Logic Programming. Computational Intelligence 8(4), National Research Council of Canada, pp. 601-623.

Although the invention(s) have been described in terms of certain preferred embodiments and certain preferred uses, other embodiments and other uses that are apparent to those of ordinary skill in the art, including embodiments and uses which do not provide all of the features and advantages set forth herein, are also within the scope of the invention(s). For example, in any method or process described herein, the acts or operations of the method/process are not necessarily limited to any particular disclosed sequence. Also, for purposes of contrasting different embodiments or the prior art, certain aspects and advantages of these embodiments are described where appropriate. It should be understood that not necessarily all such aspects and advantages need be achieved in any one embodiment. Thus, it should be recognized that certain embodiments may be carried out in a manner that achieves or optimizes one advantage or group of advantages without necessarily achieving other aspects or advantages that may be taught or suggested herein. Accordingly, the scope of the invention(s) is defined by the following claims and their obvious modifications and equivalents.

APPENDIX A

Appendix A, which forms part of the disclosure of this specification, provides an example Application Programmer's Interface (API) usable with the Flexible Constraint Propagation Engine.

Package com.actenum.cw.ac.prop com.actenum.cw.ac.prop Interface CWAcConstraintEvent
  public interface CWAcConstraintEvent extends CWAcPropagationEvent
  All Superinterfaces:
    CWAcPropagationEvent Field Summary
  public static final AWAKE
    Value: 2
  public static final INIT
    Value: 1
  Fields inherited from interface com.actenum.cw.ac.prop.CWAcPropagationEvent
    NOEVENT Method Summary
  com.actenum.cw.ac.CWAcConstraint getConstraint( )
  void setEnqueued( )
  Methods inherited from interface com.actenum.cw.ac.prop.CWAcPropagationEvent
    checkPriority, clear, getEventType, getPriority, isEnqueued, propagateEvent, setPriority Fields
  INIT
    public static final int INIT
    Constant value: 1
  AWAKE
    public static final int AWAKE
    Constant value: 2

Methods
  getConstraint
    public com.actenum.cw.ac.CWAcConstraint getConstraint( )
  setEnqueued
    public void setEnqueued( )

com.actenum.cw.ac.prop Interface CWAcNonmonotonicPropagationEngine
  public interface CWAcNonmonotonicPropagationEngine extends CWAcPropagationEngine
  All Superinterfaces:
    CWAcPropagationEngine Field Summary
  public static final ConstraintJustification
    Value: 2
  public static final Explanation
    Value: 3
  public static final NoJustification
    Value: 1

Method Summary
  CWJustification getJustification(com.actenum.cw.ac.CWAcConstraint c, int varIdx)

Find the justification for the semantics of constraint c on varIdx-th variable of c Might
  delegate computation back to the constraint
int getJustificationType( )
  Alternatives: NoJustification, ConstraintJustification, CWExplanation
void retractConstraint(com.actenum.cw.ac.CWAcConstraint c)
  Remove the effects from the previous propagations of constraint c
Methods inherited from interface com.actenum.cw.ac.prop.CWAcPropagationEngine
  engageconstraint, postConstraintEvent, postVarEvent, propagate, removeEvent Fields
  NoJustification
    public static final int NoJustification
    Constant value: 1
  ConstraintJustification
    public static final int ConstraintJustification
    Constant value: 2
  Explanation
    public static final int Explanation
    Constant value: 3
Methods
  getJustificationType
    public int getJustificationType( )
    Alternatives: NoJustification, ConstraintJustification, CWExplanation
    Returns: The justification type used by this engine
  getJustification
    public CWJustification getJustification(com.actenum.cw.ac.CWAcConstraint c, int varIdx)
    Find the justification for the semantics of constraint c on varIdx-th variable of c Might delegate computation back to the constraint
    Parameters:
      c—CWAcConstraint to be justified
      varIdx—index of variable in constraint c
    Returns: the justification
  retractConstraint
    public void retractConstraint(com.actenum.cw.ac.CWAcConstraint c)
    throws com.actenum.cw.ac.CWEmptyDomainException
    Remove the effects from the previous propagations of constraint c
    Parameters:
      c—CWAcConstraint that is being deactivated com.actenum.cw.ac.prop Interface CWAcPropagationEngine
  public interface CWAcPropagationEngine
  All Subinterfaces:
    CWAcNonronotonicPropagationEngine Method Summary
  void engageConstraint(com.actenum.cw.ac.CWAcConstraint c)
    Propagate the effects from a newly activated constraint c
  void postConstraintEvent(CWAcConstraintEvent evt)
    If not already posted, adds evt to the propagation Otherwise, updates the status of evt
  void postVarEvent(CWAcVarEvent evt)
    If not already posted, adds evt to the propagation Otherwise, updates the status of evt
  void propagate( )
    Execute this propagation engine by propagating events until no events are waiting for propagation (fix point)
  void removeEvent(CWAcPropagationEvent evt)
    If posted, removes evt from the propagation
Methods
  postVarEvent
    public void postVarEvent(CWAcVarEvent evt) throws com.actenum.cw.ac.CWEmptyDomainException
    If not already posted, adds evt to the propagation Otherwise, updates the status of evt
    Parameters:
      evt—variable event
  postConstraintEvent
    public void postConstraintEvent(CWAcConstraintEvent evt)
    If not already posted, adds evt to the propagation Otherwise, updates the status of evt
    Parameters:
      evt—constraint event
  removeEvent
    public void removeEvent(CWAcPropagationEvent evt)
    If posted, removes evt from the propagation
    Parameters:
      evt—variable or constraint event
  propagate
    public void propagate( ) throws com.actenum.cw.ac.CWEmptyDomainException
    Execute this propagation engine by propagating events until no events are waiting for propagation (fix point)
  engageconstraint
    public void engageConstraint(com.actenum.cw.ac.CWAcConstraint c) throws com.actenum.cw.ac.CWEmptyDomainException
    Propagate the effects from a newly activated constraint c
    Parameters:
      c—CWAcConstraint that is being activated com.actenum.cw.ac.prop Interface CWAcPropagationEvent
  All Subinterfaces:
    CWAcConstraintEvent
  All Known Implementing Classes:
    CWAcVarEvent
  public interface CWAcPropagationEvent Field Summary
  public static final NOEVENT
    Value: 0
Method Summary
  int checkPriority( )
    The priority of propagation events is used to determine when they will be executed.
  void clear( )
    Reset this event to NOEVENT
  int getEventType( )
  int getPriority( )
    The priority of propagation events is used to determine when they will be executed.
  boolean isEnqueued( )
  void propagateEvent( )
    Execute the semantics of this event Propagate information to all listeners of this event.
  void setPriority(int p)
    The priority of propagation events is used to determine when they will be executed.

Fields
  NOEVENT
    public static final int NOEVENT
    Constant value: 0
Methods
  propagateEvent
    public void propagateEvent( )
    throws com.actenum.cw.ac.CWEmptyDomainException
    Execute the semantics of this event Propagate information to all listeners of this event.
  getPriority
    public int getPriority( )
    The priority of propagation events is used to determine when they will be executed.
    Returns: the priority
  setPriority
    public void setPriority(int p)
    The priority of propagation events is used to determine when they will be executed.
    Parameters:
      p—the priority
  checkPriority
    public int checkPriority( )
    The priority of propagation events is used to determine when they will be executed.
    Returns: the priority corresponding to the current state of this event (may be diff from getPriority)
  isEnqueued
    public boolean isEnqueued( )
    Returns: true if this event has already been posted and is waiting for propagation
  getEventType
    public int getEventType( )
    Returns: the current event type
  clear
    public void clear( )
    Reset this event to NOEVENT com.actenum.cw.ac.prop Class CWAcVarEvent java.lang.Object
  |
  +-com.actenum.cw.ac.prop.CWAcVarEvent
  All Implemented Interfaces:
    CWAcPropagationEvent
  public abstract class CWAcVarEvent
    extends java.lang.Object
    implements CWAcPropagationEvent
  Fields inherited from interface com.actenum.cw.ac.prop.CWAcPropagationEvent
    NOEVENT Constructor Summary
  public CWAcVarEvent( )

Method Summary
  abstract com.actenum.cw.ac.CWAcVar getAcVar( )
    accessor of variable causing event.
  abstract boolean is DecrMax( )
    returns true if DECMAX event occurred, else false.
  static boolean is DecrMax(int evtType)
    returns true if DECMAX event occurred, else false.
  abstract boolean isIncrMin( )
    returns true if INCMIN event occurred, else false.
  static boolean isIncrMin(int evtType)
    returns true if INCMIN event occurred, else false.
  abstract boolean isInstantiated( )
    returns true if INST event occurred, else false.
  static boolean isInstantiated(int evtType)
    returns true if INST event occurred, else false.
  abstract boolean is NoEvent( )
  static boolean is NoEvent(int evtType)
  abstract boolean is ReducedBounds( )
    returns true if REDBOUNDS event occurred, else false.
  static boolean is ReducedBounds(int evtType)
    returns true if REDBOUNDS event occurred, else false.
  abstract boolean is RemovedDomain( )
    returns true if REMDOM event occurred, else false.
  static boolean is RemovedDomain(int evtType)
    returns true if REMDOM event occurred, else false.
  abstract boolean is RemovedVal( )
    returns true if REMVAL event occurred, else false.
  static boolean is RemovedVal(int evtType)
    returns true if REMVAL event occurred, else false.
  abstract boolean is Restore( )
    returns true if any restore event occurred else false.
  static boolean is Restore(int evtType)
    returns true if any restore event occurred else false.
  abstract boolean is RestoreBounds( )
    returns true if RESTBOUNDS event occurred, else false.
  static boolean is RestoreBounds(int evtType)
    returns true if RESTBOUNDS event occurred, else false.
  abstract boolean is RestoreDomain( )
    returns true if RESTDOM event occurred, else false.
  static boolean is RestoreDomain(int evtType)
    returns true if RESTDOM event occurred, else false.
  abstract boolean is RestoreMax( )
    returns true if RESTMAX event occurred, else false.
  static boolean is RestoreMax(int evtType)
    returns true if RESTMAX event occurred, else false.
  abstract boolean is RestoreMin( )
    returns true if RESTMIN event occurred, else false.
  static boolean is RestoreMin(int evtType)
    returns true if RESTMIN event occurred, else false
  abstract boolean is RestoreValue( )
    returns true if RESTVAL event occurred, else false.
  static boolean is RestoreValue(int evtType)
    returns true if RESTVAL event occurred, else false.
  Methods inherited from class java.lang.Object
    equals, getclass, hashCode, notify, notifyAll, toString, wait, wait, wait
  Methods inherited from interface com.actenum.cw.ac.prop.CWAcPropagationEvent
    checkPriority, clear, getEventType, getPriority, isEnqueued, propagateEvent, setPriority Constructors
  CWAcVarEvent
    public CWAcVarEvent( )

Methods
  getAcVar
    public abstract com.actenum.cw.ac.CWAcVar getAcVar( )
    accessor of variable causing event.
  is NoEvent
    public static boolean is NoEvent(int evtType)
  isIncrMin
    public static boolean isIncrMin(int evtType)
    returns true if INCMIN event occurred, else false.

isDecrMax
    public static boolean is DecrMax(int evtType)
    returns true if DECMAX event occurred, else false.
is ReducedBounds
    public static boolean is ReducedBounds(int evtType)
    returns true if REDBOUNDS event occurred, else false. A reduced bounds event is a generalization of INCMIN and DECMAX events. Whenever an INCMIN or DECMAX event occurs a REDBOUNDS event also occurs.
is RemovedVal
    public static boolean is RemovedVal(int evtType)
    returns true if REMVAL event occurred, else false.
is RemovedDomain
    public static boolean is RemovedDomain(int evtType)
    returns true if REMDOM event occurred, else false. A removed domain event is a generalization of INCMIN, DECMAX, REMVAL and REDBOUNDS events. Whenever any of these events occurs a REMDOM event also occurs.
isInstantiated
    public static boolean isInstantiated(int evtType)
    returns true if INST event occurred, else false.
is RestoreMin
    public static boolean is RestoreMin(int evtType)
    returns true if RESTMIN event occurred, else false.
is RestoreMax
    public static boolean is RestoreMax(int evtType)
    returns true if RESTMAX event occurred, else false.
is RestoreBounds
    public static boolean is RestoreBounds(int evtType)
    returns true if RESTBOUNDS event occurred, else false. A restore bounds event is a generalization of RESTMIN and RESTMAX events. Whenever any of these event occurs a RESTBOUNDS event also occurs.
is RestoreValue
    public static boolean is RestoreValue(int evtType)
    returns true if RESTVAL event occurred, else false.
is RestoreDomain
    public static boolean is RestoreDomain(int evtType)
    returns true if RESTDOM event occurred, else false. A restore domain event is a generalization of RESTMIN, RESTMAX, RESTVAL and RESTBOUNDS events. Whenever any of these events occurs a RESTDOM event also occurs.
is Restore
    public static boolean is Restore(int evtType)
    returns true if any restore event occurred else false.
is NoEvent
    public abstract boolean is NoEvent( )
isIncrMin
    public abstract boolean isIncrMin( )
    returns true if INCMIN event occurred, else false.
is DecrMax
    public abstract boolean is DecrMax( )
    returns true if DECMAX event occurred, else false.
is ReducedBounds
    public abstract boolean is ReducedBounds( )
    returns true if REDBOUNDS event occurred, else false. A reduced bounds event is a generalization of INCMIN and DECMAX events. Whenever an INCMIN or DECMAX event occurs a REDBOUNDS event also occurs.
is RemovedVal
    public abstract boolean is RemovedVal( )
    returns true if REMVAL event occurred, else false.
is RemovedDomain
    public abstract boolean is RemovedDomain( )
    returns true if REMDOM event occurred, else false. A removed domain event is a generalization of INCMIN, DECMAX, REMVAL and REDBOUNDS events. Whenever any of these events occurs a REMDOM event also occurs.
isInstantiated
    public abstract boolean isInstantiated( )
    returns true if INST event occurred, else false.
is RestoreMin
    public abstract boolean is RestoreMin( )
    returns true if RESTMIN event occurred, else false.
is RestoreMax
    public abstract boolean is RestoreMax( )
    returns true if RESTMAX event occurred, else false.
is RestoreBounds
    public abstract boolean is RestoreBounds( )
    returns true if RESTBOUNDS event occurred, else false. A restore bounds event is a generalization of RESTMIN and RESTMAX events. Whenever any of these event occur a RESTBOUNDS event also occurs.
is RestoreValue
    public abstract boolean is RestoreValue( )
    returns true if RESTVAL event occurred, else false.
is RestoreDomain
    public abstract boolean is RestoreDomain( )
    returns true if RESTDOM event occurred, else false. A restore domain event is a generalization of RESTMIN, RESTMAX, RESTVAL and RESTBOUNDS events. Whenever any of these events occurs a RESTDOM event also occurs.
is Restore
    public abstract boolean is Restore( )
    returns true if any restore event occurred else false.

com.actenum.cw.ac.prop Interface CWExplanation
    All Superinterfaces:
        CWJustification
    public interface CWExplanation
        extends CWJustification
    Methods inherited from interface com.actenum.cw.ac.prop.CWJustification
        getTimeStamp com.actenum.cw.ac.prop Interface CWJustification
    All Subinterfaces:
        CWExplanation
    public interface CWJustification Method Summary
    int getTimeStamp( )

Methods
    getTimeStamp
        public int getTimeStamp( )

What is claimed is:

1. A system configured to search for solutions to a combinatorial optimization problem, the system comprising:
    a memory for storing information related to at least one constraint of a combinatorial optimization problem, the combinatorial optimization problem comprising variables and constraints that specify relationships among one or more of the variables, the memory further storing executable instructions that implement a constraint system, a propagator system, and a search engine; and
    a computer system programmed to execute the executable instructions;

wherein the constraint system is configured to provide at least one message related to the at least one constraint, the message comprising at least one of an add constraint message and a retract constraint message, the propagator system is configured to receive the at least one message from the constraint system and to provide constraint propagation instructions in response to the received message, the constraint propagation instructions including instructions for processing (1) a variable event that represents a change to a value or a domain of a variable and (2) a constraint event that represents a change to a value or a domain of a variable associated with the constraint, and the search engine is configured to search for a solution to the combinatorial optimization problem based at least in part on the actions performed by the constraint system and the propagator system.

2. The system of claim 1, wherein the constraint propagation instructions comprise monotonic constraint propagation instructions.

3. The system of claim 1, wherein the constraint propagation instructions comprise non-monotonic constraint propagation instructions.

4. The system of claim 1, wherein the constraint propagation instructions are selected according to a characteristic of the combinatorial optimization problem.

5. The system of claim 4, wherein the characteristic is related to whether the combinatorial optimization problem comprises a dynamic problem.

6. The system of claim 4, wherein the characteristic is related to whether the combinatorial optimization problem comprises a mixed-initiative problem.

7. The system of claim 1, wherein the constraint propagation instructions comprise instructions generated by a user from an application programmer's interface (API).

8. The system of claim 7, wherein the user-generated instructions specify a constraint propagation or retraction algorithm.

9. The system of claim 1, wherein the constraint propagation instructions comprise updating a variable value or a variable domain associated with the at least one constraint.

10. The system of claim 1, wherein the constraint propagation instructions comprise providing a justification for a constraint event, wherein the justification comprises a data structure specifying a reason for the constraint event.

11. The system of claim 1, wherein the message comprises an add constraint message.

12. The system of claim 1, wherein the message comprises a retract constraint message.

13. The system of claim 1, wherein the message comprises an add constraint message and a retract constraint message.

14. The system of claim 1, wherein the search engine is a reconfigurable search engine assembled from a library of reconfigurable or reusable search engine components.

15. The system of claim 1, wherein the propagator system is configured to use a queue for processing variable events.

16. The system of claim 1, wherein the propagator system is configured to use a queue for processing constraint events.

17. The system of claim 1, wherein the propagator system is configured to use a queue for processing variable events and constraint events.

18. The system of claim 17, wherein the propagator system is configured to queue the events according to a priority indicative of expected computational complexity or domain reduction power.

19. A method for constraint propagation in a search engine configured to search for a solution of a combinatorial optimization problem, the method comprising:

communicating to a propagation processor information relating to an event associated with a solution of a combinatorial optimization problem, the propagation processor comprising hardware capable of executing instructions for a variable event that represents a change to a value or a domain of a variable and a constraint event that represents a change to a value or a domain of a variable associated with the constraint;

in response to said event information, executing instructions related to the event by the propagation processor, wherein the instructions comprise variable event instructions for a variable event or constraint event instructions for a constraint event, wherein:

(1) the variable event instructions are adapted for:
   signaling information related to the variable event to a constraint of the combinatorial optimization problem;
   determining whether the variable event is relevant to the constraint; and
   updating a constraint event if the variable event is relevant to the constraint; and (2) the constraint event instructions are adapted for:
   propagating information related to the constraint event to a constraint of the combinatorial optimization problem;
   reducing a variable domain of a variable associated with the constraint; and
   updating a variable event associated with the reduced variable domain; and searching for a solution to the combinatorial optimization problem based at least in part on the updated variable event or the updated constraint event.

20. The method of claim 19, wherein the constraint event instructions are further adapted for providing a justification comprising a data structure specifying a reason for reducing the variable domain of the variable associated with the constraint.

21. The method of claim 20, wherein the constraint event instructions are further adapted for restoring the variable domain if the constraint is retracted.

22. The method of claim 19, wherein executing instructions related to the event comprises adding the event to at least one queue for subsequent processing by the propagation processor.

23. The method of claim 22, wherein a variable event is added to the at least one queue.

24. The method of claim 22, wherein a constraint event is added to the at least one queue.

25. The method of claim 22, wherein a variable event and a constraint event are added to the at least one queue.

26. The method of claim 22, wherein the event is added to the at least one queue according to a priority indicative of expected computational complexity or domain reduction power.

27. The method of claim 22, wherein the at least one queue comprises at least two queues.

28. A computer-readable storage medium comprising computer-executable instructions embodying the method of claim 19.

29. A computer-implemented method for configuring a constraint propagation engine, the method comprising:

storing, in a physical storage device, a library of propagator components, the library including at least one propagator component implementing a variable-centered propagation method and at least one propagator component implementing a constraint-centered propagation method;

receiving combinatorial optimization problem (COP) information relating to a COP model comprising a COP type, variables, and constraints;

receiving a performance benchmark relating to a constraint propagation method usable with a search engine configured to search for a solution to the COP model, the performance benchmark comprising information relating to run-time performance or storage requirements of the constraint propagation method; and configuring from the library of propagator components via execution of instructions by a computer system, a constraint propagation engine for use with the search engine using at least the COP information and the performance benchmark, wherein said configuring comprises selecting at least one propagator component from the library of propagator components such that the storage requirement of the constraint propagation engine is reduced or the run-time performance of the constraint propagation engine is increased.

30. The method of claim 29, wherein the COP information is in an extensible markup language (XML) document.

31. The method of claim 29, wherein configuring a constraint propagation engine further comprises using information relating to an amount of user interaction with the search engine.

32. A computer-readable storage medium comprising computer-executable instructions embodying the method of claim 29.

33. The system of claim 1, wherein the memory comprises at least one physical storage device.

34. The system of claim 1, wherein the computer system comprises at least one processor.

35. The system of claim 1, wherein the combinatorial optimization problem comprises a job shop scheduling problem, a vehicle routing problem, a multimode resource scheduling problem, an oversubscribed resource scheduling problem, an asset scheduling management problem, or a timetabling problem.

36. The method of claim 19, wherein the propagation processor comprises at least one computing device.

37. The method of claim 24, wherein a variable event is executed by the propagation processor rather than being added to the at least one queue.

38. The method of claim 29, wherein whether the storage requirement of the constraint propagation engine is reduced or the run-time performance of the constraint propagation engine is increased is determined in comparison to storage requirements or run-time performance if another propagator component from the library had been selected for the constraint propagation engine.

39. The method of claim 29, wherein the library of propagator components comprises at least one monotonic propagation component and at least one non-monotonic propagation component.

40. The method of claim 29, wherein the library of propagator components comprises at least one constraint retraction component.

41. The method of claim 29, wherein the computer system comprises at least one processing device.

* * * * *

UNITED STATES PATENT AND TRADEMARK OFFICE
CERTIFICATE OF CORRECTION

PATENT NO. : 7,606,776 B1  Page 1 of 1
APPLICATION NO. : 11/529764
DATED : October 20, 2009
INVENTOR(S) : Havens et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this

Twelfth Day of October, 2010

David J. Kappos
*Director of the United States Patent and Trademark Office*